(12) United States Patent
Willison

(10) Patent No.: US 11,299,208 B1
(45) Date of Patent: Apr. 12, 2022

(54) LAND VEHICLES INCORPORATING MONOCOQUES AND MODULAR MOLD SYSTEMS FOR MAKING THE SAME

(71) Applicant: Workhorse Group Inc., Loveland, OH (US)

(72) Inventor: Robert Willison, Lebanon, OH (US)

(73) Assignee: Workhorse Group Inc., Loveland, OH (US)

(*) Notice: Subject to any disclaimer, the term of this patent is extended or adjusted under 35 U.S.C. 154(b) by 0 days.

(21) Appl. No.: 17/552,718

(22) Filed: Dec. 16, 2021

Related U.S. Application Data

(63) Continuation of application No. 17/142,766, filed on Jan. 6, 2021, now Pat. No. 11,220,297.

(Continued)

(51) Int. Cl.
| | |
|---|---|
| *B62D 23/00* | (2006.01) |
| *B29C 70/28* | (2006.01) |
| *B29C 69/02* | (2006.01) |
| *B62D 29/04* | (2006.01) |
| *B60K 1/02* | (2006.01) |
| *B62D 25/20* | (2006.01) |
| *B62D 29/02* | (2006.01) |
| *B62D 33/06* | (2006.01) |
| *B62D 65/10* | (2006.01) |

(Continued)

(52) U.S. Cl.
CPC ............ *B62D 23/00* (2013.01); *B29C 69/02* (2013.01); *B29C 70/28* (2013.01); *B60K 1/02* (2013.01); *B62D 23/005* (2013.01); *B62D 25/20* (2013.01); *B62D 29/02* (2013.01); *B62D 29/043* (2013.01); *B62D 29/046* (2013.01); *B62D 33/06* (2013.01); *B62D 65/10* (2013.01); *B29K 2309/08* (2013.01); *B29K 2311/14* (2013.01); *B29L 2031/30* (2013.01); *B29L 2031/3055* (2013.01)

(58) Field of Classification Search
CPC .............................. B62D 23/00; B62D 29/046
USPC ....................................................... 296/181.2
See application file for complete search history.

(56) References Cited

U.S. PATENT DOCUMENTS

| | | | |
|---|---|---|---|
| 4,705,716 | A | 11/1987 | Tang |
| 5,363,939 | A | 11/1994 | Catlin |

(Continued)

FOREIGN PATENT DOCUMENTS

| | | |
|---|---|---|
| CN | 103359174 A | 10/2013 |
| EP | 1538072 A1 | 6/2005 |

(Continued)

OTHER PUBLICATIONS

International Search Report; International Searching Authority; International Patent Application No. PCT/US2021/012327; dated Mar. 9, 2021; 2 pages.

(Continued)

*Primary Examiner* — Jason S Morrow
(74) *Attorney, Agent, or Firm* — Taft Stettinius & Hollister LLP

(57) ABSTRACT

Land vehicles, modular systems for forming monocoques of land vehicles, and methods of forming monocoques of land vehicles using modular systems are disclosed herein. In certain embodiments, the land vehicles are provided as delivery vehicles and/or utility vehicles. A land vehicle includes a monocoque supporting a plurality of wheels to permit movement of the vehicle relative to an underlying surface in use of the land vehicle.

20 Claims, 12 Drawing Sheets

Related U.S. Application Data

(60) Provisional application No. 62/957,577, filed on Jan. 6, 2020.

(51) Int. Cl.
  *B29L 31/30*   (2006.01)
  *B29K 311/14*  (2006.01)
  *B29K 309/08*  (2006.01)

(56) References Cited

U.S. PATENT DOCUMENTS

| | | | |
|---|---|---|---|
| 6,296,301 | B1 | 10/2001 | Schroeder et al. |
| 6,926,351 | B2 | 8/2005 | Telehowski et al. |
| 6,971,650 | B2 * | 12/2005 | Marelja ............... B62D 29/043 296/181.1 |
| 8,641,133 | B1 | 2/2014 | Scaringe et al. |
| 8,991,900 | B2 | 3/2015 | Yamaji et al. |
| 10,967,904 | B2 | 4/2021 | Penz et al. |
| 2008/0003321 | A1 | 1/2008 | Kerr et al. |
| 2010/0025132 | A1 | 2/2010 | Hill et al. |
| 2010/0263954 | A1 | 10/2010 | Constans |
| 2011/0017527 | A1 | 1/2011 | Oriet et al. |
| 2012/0104793 | A1 | 5/2012 | Danielson et al. |
| 2012/0104799 | A1 | 5/2012 | Danielson et al. |
| 2012/0104803 | A1 | 5/2012 | Thomas et al. |
| 2013/0241237 | A1 | 9/2013 | Dziuba et al. |
| 2013/0341971 | A1 | 12/2013 | Masini et al. |
| 2015/0027795 | A1 | 1/2015 | Hirai et al. |
| 2018/0037151 | A1 | 2/2018 | Bauer et al. |
| 2018/0345777 | A1 | 12/2018 | Birnschein et al. |

FOREIGN PATENT DOCUMENTS

| | | |
|---|---|---|
| EP | 2552763 A2 | 2/2013 |
| EP | 3174680 A2 | 6/2017 |
| EP | 3689717 A1 | 8/2020 |
| FR | 2698601 A1 | 6/1994 |
| WO | 2011145129 A1 | 11/2011 |
| WO | 2016016662 A2 | 2/2016 |

OTHER PUBLICATIONS

Written Opinion of the International Searching Authority; International Searching Authority; International Patent Application No. PCT/US2021/012327; dated Mar. 9, 2021; 8 pages.

International Search Report; International Searching Authority; International Patent Application No. PCT/US2021/012330; dated Mar. 9, 2021; 2 pages.

Written Opinion of the International Searching Authority; International Searching Authority; International Patent Application No. PCT/US2021/012330; dated Mar. 9, 2021; 9 pages.

International Search Report; International Searching Authority; International Patent Application No. PCT/US2021/012332; dated Mar. 24, 2021; 2 pages.

Written Opinion of the International Searching Authority; International Searching Authority; International Patent Application No. PCT/US2021/012332; dated Mar. 24, 2021; 7 pages.

Supplementary European Search Report; European Patent Office; European Application No. 21710384.5; dated Oct. 21, 2021; 12 pages.

\* cited by examiner

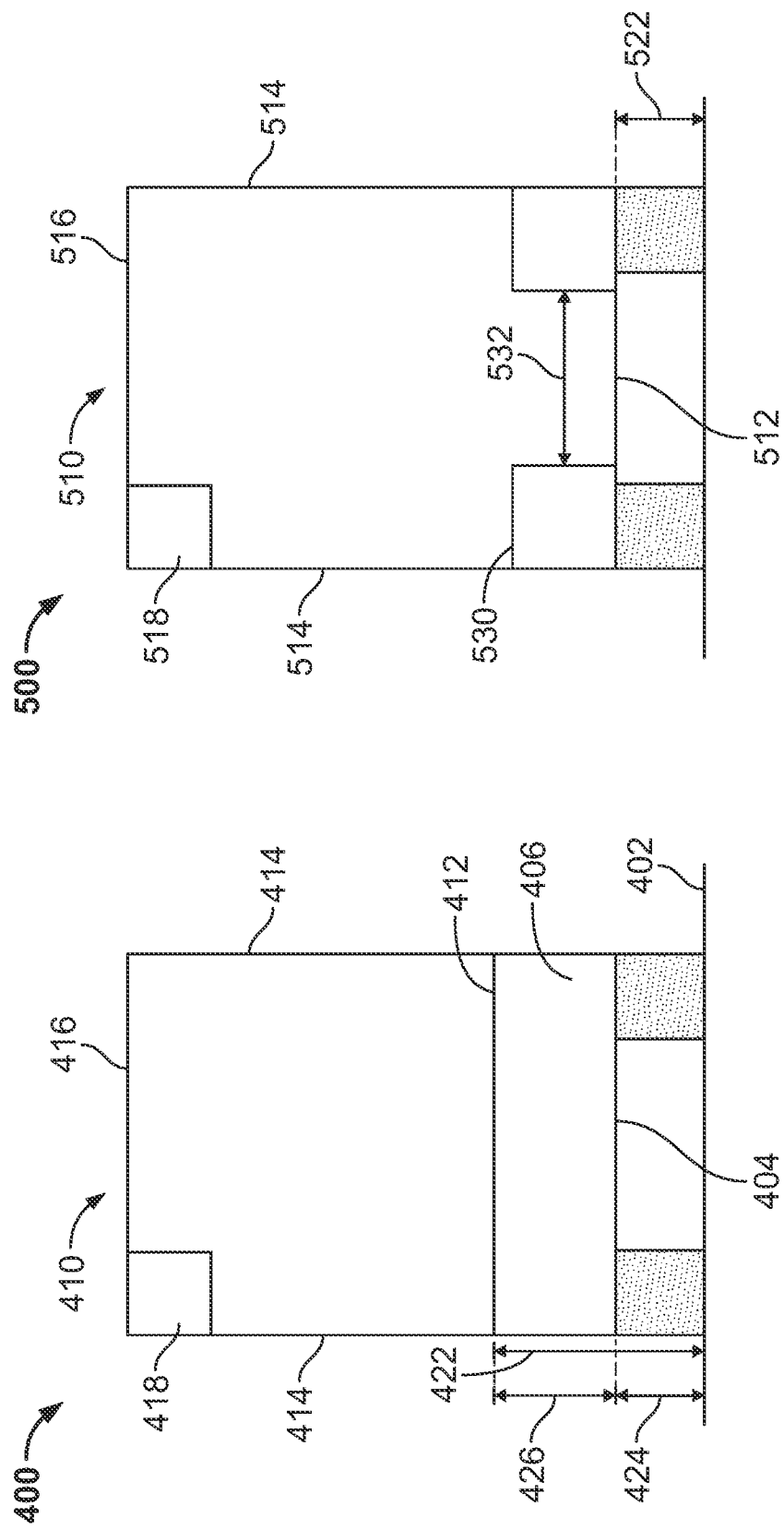

| US Truck Class | Duty Classification | Weight Limit |
| --- | --- | --- |
| Class 1 | Light Truck | 0-6,000 Pounds |
| Class 2a | Light Truck | 6,001-8,500 Pounds |
| Class 2b | Light/Medium Truck | 8,501-10,000 Pounds |
| Class 3 | Medium Truck | 10,001-14,000 Pounds |
| Class 4 | Medium Truck | 14,001-16,000 Pounds |
| Class 5 | Medium Truck | 16,001-19,500 Pounds |
| Class 6 | Medium Truck | 19,501-26,000 Pounds |
| Class 7 | Heavy Truck | 26,001-33,000 Pounds |
| Class 8 | Heavy Truck | 33,001 Pounds + |

FIG. 6

LAND VEHICLES INCORPORATING MONOCOQUES AND MODULAR MOLD SYSTEMS FOR MAKING THE SAME

CROSS-REFERENCE TO RELATED APPLICATION(S)

The present application is a continuation application of, and claims the priority benefit of, U.S. application Ser. No. 17/142,766, which was filed on Jan. 6, 2021, and which claims priority to, and the benefit of, U.S. Provisional App. Ser. No. 62/957,577 entitled "SYSTEMS AND METHODS FOR MANUFACTURING LAND VEHICLES," which was filed on Jan. 6, 2020. The contents of those applications are incorporated by reference herein in their entireties.

TECHNICAL FIELD

The present disclosure generally relates to land vehicles and methods of making land vehicles, and, more particularly, to utility and deliver vehicles and methods of making utility and delivery vehicles.

BACKGROUND

Current systems and methods for manufacturing utility and delivery vehicles suffer from a variety of drawbacks and limitations. For those reasons, among others, there remains a need for further improvements in this technological field.

SUMMARY

The present disclosure may comprise one or more of the following features and combinations thereof.

According to one aspect of the present disclosure, a land vehicle may include a monocoque supporting a plurality of wheels to permit movement of the vehicle relative to an underlying surface in use of the land vehicle. The monocoque may be a single-piece, monolithic structure unsupported by an internal chassis. The monocoque may include a front cage defining an operator cabin and a rear floor positioned rearward of the front cage. The monocoque may have a composite construction such that each of the front cage and the rear floor are formed from one or more composite materials.

In some embodiments, the monocoque may not include metallic material, the monocoque may include a core and a shell that at least partially surrounds the core, the core may be formed from one or more lightweight, low-density materials, and the shell may be formed from resin and fiberglass. The core may include balsa wood. The core may include one or more of the following: fiberglass, Kevlar, carbon fiber, or plastic. The monocoque may include a laminate layer that at least partially covers the shell.

In some embodiments, the monocoque may include an intermediate section disposed between the front cage and the rear floor, the vehicle may include a stowage compartment at least partially defined by the intermediate section and the rear floor that has a plurality of sidewalls and a ceiling, each of the intermediate section, the plurality of sidewalls, and the ceiling may be formed from one or more composite materials, and each of the intermediate section, the plurality of sidewalls, and the ceiling may not include metallic material. The stowage compartment may have a volume of 650 cubic feet, 1000 cubic feet, or 1200 cubic feet. Additionally, in some embodiments, the vehicle may have a weight limit of between 10,001 pounds and 14,000 pounds.

Further, in some embodiments still, the land vehicle may include a refrigeration unit at least partially housed by the stowage compartment that is configured to cool the stowage compartment.

In some embodiments, the vehicle may not include an internal combustion engine. A height of the rear floor above the underlying surface may be between 22 inches and 28 inches.

According to another aspect of the present disclosure, a modular system for forming a monocoque of a land vehicle may include a front cage mold unit, a rear floor mold unit, and a plurality of intermediate mold units. The front cage mold unit may include a front cage mold cavity that has a size and a shape corresponding to a front cage of the monocoque defining an operator cabin. The front cage mold unit may have an opening at a rear end thereof to establish a fluidic coupling between the front cage mold cavity and another component of the system. The rear floor mold unit may include a rear floor mold cavity that has a size and a shape corresponding to a rear floor of the monocoque positioned rearward of the front cage. The rear floor mold unit may have an opening at a front end thereof to establish a fluidic coupling between the rear floor mold cavity and another component of the system. Each of the plurality of intermediate mold units may be sized for positioning between the front cage mold unit and the rear floor mold unit. Each of the plurality of intermediate mold units may include an intermediate mold cavity that has a size and a shape corresponding to an intermediate section of the monocoque positioned between the front cage and the rear floor. Each of the plurality of intermediate mold units may have a front opening at a front end thereof to establish a fluidic coupling between the intermediate mold cavity and the front cage mold cavity and a rear opening at a rear end thereof to establish a fluidic coupling between the intermediate mold cavity and the rear floor mold cavity.

In some embodiments, the front end of each of the plurality of intermediate mold units may be configured for direct connection to the rear end of the front cage mold unit. The rear end of each of the plurality of intermediate mold units may be configured for direct connection to the front end of the rear floor mold unit. When any one of the intermediate mold units is directly connected with the front cage mold unit and the rear floor mold unit, the front cage mold cavity, the intermediate mold cavity, and the rear floor mold cavity may be fluidically coupled to one another in a contiguous arrangement to establish a continuous monocoque mold cavity into which one or more composite materials may be introduced to form the monocoque as a single-piece, monolithic structure.

In some embodiments, the rear end of the front cage mold unit may be configured for direct connection to the front end of the rear floor mold unit. When the front cage mold unit is directly connected to the rear floor mold unit, the front cage mold unit and the rear floor mold unit may be fluidically coupled to one another in a contiguous arrangement to establish a continuous monocoque mold cavity into which one or more composite materials may be introduced to form the monocoque as a single-piece, monolithic structure.

In some embodiments, the plurality of intermediate mold units may include a first intermediate mold unit having a first length, a second intermediate mold unit having a second length greater than the first length, and a third intermediate mold unit having a third length greater than the second length. The first intermediate mold unit may be sized to form an intermediate section of the monocoque included in a vehicle having a storage volume of 650 cubic feet, the second intermediate mold unit may be sized to form an intermediate section of the monocoque included in a vehicle having a storage volume of 1000 cubic feet, and the third intermediate mold unit may be sized to form an intermediate section of the monocoque included in a vehicle having a storage volume of 1200 cubic feet.

According to yet another aspect of the present disclosure, a land vehicle may include a monocoque supporting a plurality of wheels to permit movement of the vehicle relative to an underlying surface in use of the land vehicle. The monocoque may be a single-piece, monolithic structure unsupported by an internal chassis. The monocoque may include a front cage defining an operator cabin, a rear floor positioned rearward of the front cage, and an intermediate section disposed between the front cage and the rear floor. The monocoque may include a core formed from balsa wood or plastic and a shell formed from resin and fiberglass that at least partially surrounds the core. The monocoque may be formed by a modular system including a front cage mold unit, a rear floor mold unit, and an intermediate mold unit. The front cage mold unit may include a front cage mold cavity that has a size and a shape corresponding to the front cage of the monocoque. The front cage mold unit may have an opening at a rear end thereof to establish a fluidic coupling between the front cage mold cavity and another component of the system. The rear floor mold unit may include a rear floor mold cavity that has a size and a shape corresponding to the rear floor of the monocoque. The rear floor mold unit may have an opening at a front end thereof to establish a fluidic coupling between the rear floor mold cavity and another component of the system. The intermediate mold unit may be sized for positioning between the front cage mold unit and the rear floor mold unit. The intermediate mold unit may include an intermediate mold cavity that has a size and a shape corresponding to the intermediate section of the monocoque. The intermediate mold unit may have a front opening at a front end thereof to establish a fluidic coupling between the intermediate mold cavity and the front cage mold cavity and a rear opening at a rear end thereof to establish a fluidic coupling between the intermediate mold cavity and the rear floor mold cavity.

According to yet another aspect of the present disclosure still, a method of forming a monocoque of a land vehicle using a modular system may include the following: selecting a monocoque configuration of the land vehicle; selecting a first mold unit of the modular system based upon the selected monocoque configuration; coupling the selected first mold unit to a front cage mold unit of the modular system such that a front cage mold cavity of the front cage mold unit is fluidly coupled to a mold cavity of the selected first mold unit to at least partially establish a continuous monocoque mold cavity; introducing one or more composite materials into the continuous monocoque mold cavity; and curing the one or more composite materials in the continuous monocoque mold cavity to form the monocoque.

In some embodiments, introducing the one or more composite materials into the continuous monocoque mold cavity may include introducing the one or more composite materials into the continuous monocoque mold cavity without introducing metallic material into the continuous monocoque mold cavity. Additionally, in some embodiments, the front cage mold unit of the modular system may correspond to a front cage of the monocoque that defines an operator cabin of the vehicle, and the selected first mold unit of the modular system may correspond to a rear floor of the monocoque that is positioned rearward of the front cage.

In some embodiments, introducing the one or more composite materials into the continuous monocoque mold cavity may include placing a first material in the continuous monocoque mold cavity and placing a second material different from the first material in the continuous monocoque mold cavity. The first material may include balsa wood or plastic, and the second material may include fiberglass and resin. Curing the one or more composite materials in the continuous monocoque mold cavity may include forming a core including the first material and forming a shell including the second material that at least partially surrounds the core.

In some embodiments, the front cage mold unit of the modular system may correspond to a front cage of the monocoque that defines an operator cabin of the vehicle, and the selected first mold unit of the modular system may correspond to an intermediate section of the monocoque that is positioned rearward of the front cage. The method may further include selecting a second mold unit of the modular system corresponding to a rear floor of the monocoque that is positioned rearward of the front cage and the intermediate section based upon the selected monocoque configuration, and coupling the selected first mold unit to the selected second mold unit such that the front cage mold cavity of the front cage mold unit, the cavity of the selected first mold unit, and a mold cavity of the selected second mold unit are fluidly coupled to one another to establish the continuous monocoque mold cavity. Selecting the first mold unit of the modular system may include selecting one of a small intermediate section mold unit of the modular system having a first length, a medium intermediate section mold unit of the modular system having a second length greater than the first length, and a large intermediate section mold unit of the modular system having a third length greater than the second length.

According to a further aspect of the present disclosure, a method of forming multiple monocoques of land vehicles using at least one modular system may include the following: selecting a first monocoque configuration for a first monocoque of a first land vehicle; selecting a first mold unit of at least one modular system based upon the selected first monocoque configuration; coupling the selected first mold unit to a front cage mold unit of the at least one modular system such that a front cage mold cavity of the front cage mold unit is fluidly coupled to a mold cavity of the selected first mold unit to at least partially establish a first continuous monocoque mold cavity; introducing one or more composite materials into the first continuous monocoque mold cavity; curing the one or more composite materials in the first continuous monocoque mold cavity to form the first monocoque; selecting a second monocoque configuration for a second monocoque of a second land vehicle different from the first land vehicle; selecting a first mold unit of at least one modular system based upon the selected second monocoque configuration that is different from the selected first mold unit of the at least one modular system; coupling the selected first mold unit of the at least one modular system to a front cage mold unit of the at least one modular system such that a front cage mold cavity of the front cage mold unit of the at least one modular system is fluidly coupled to a mold cavity of the selected first mold unit of the at least one modular system to at least partially establish a second continuous monocoque mold cavity; introducing one or more composite materials into the second continuous monocoque mold cavity; and curing the one or more composite materials in the second continuous monocoque mold cavity to form the second monocoque.

In some embodiments, introducing the one or more composite materials into the first continuous monocoque mold cavity may include introducing the one or more composite materials into the first continuous monocoque mold cavity without introducing metallic material into the first continuous monocoque mold cavity, and introducing the one or more composite materials into the second continuous monocoque mold cavity may include introducing the one or more composite materials into the second continuous monocoque mold cavity without introducing metallic material into the second continuous monocoque mold cavity.

In some embodiments, introducing the one or more composite materials into the first continuous monocoque mold cavity may include placing a first material in the first continuous monocoque mold cavity and placing a second material different from the first material in the first continuous monocoque mold cavity, and introducing the one or more composite materials into the second continuous monocoque mold cavity may include placing the first material in the second continuous monocoque mold cavity and placing the second material in the second continuous monocoque mold cavity. The first material may include balsa wood or plastic and the second material may include fiberglass and resin. Curing the one or more composite materials in the first continuous monocoque mold cavity may include forming a core of the first monocoque including the first material and forming a shell of the first monocoque including the second material that at least partially surrounds the core of the first monocoque, and curing the one or more composite materials in the second continuous monocoque mold cavity may include forming a core of the second monocoque including the first material and forming a shell of the second monocoque including the second material that at least partially surrounds the core of the second monocoque.

In some embodiments, the front cage mold unit of the at least one modular system may correspond to a front cage of the first monocoque that defines an operator cabin of the first land vehicle, the selected first mold unit of the at least one modular system may correspond to a rear floor of the first monocoque that is positioned rearward of the front cage of the first monocoque, the front cage mold unit of the at least one modular system may correspond to a front cage of the second monocoque that defines an operator cabin of the second land vehicle, and the selected first mold unit of the at least one modular system may correspond to an intermediate section of the second monocoque that is positioned rearward of the front cage of the second monocoque.

In some embodiments, the method may further include selecting a second mold unit of the at least one modular system corresponding to a rear floor of the second monocoque that is positioned rearward of the front cage and the intermediate section of the second monocoque based upon the selected second monocoque configuration, and coupling the selected first mold unit of the at least one modular system to the selected second mold unit of the at least one modular system such that the front cage mold cavity of the front cage mold unit of the at least one modular system, the cavity of the selected first mold unit of the at least one modular system, and a mold cavity of the selected second mold unit of the at least one modular system are fluidly coupled to one another to establish the second continuous monocoque mold cavity. Selecting the first mold unit of the at least one modular system may include selecting one of a small intermediate section mold unit of the at least one modular system having a first length, a medium intermediate section mold unit of the at least one modular system having a second length greater than the first length, and a large intermediate section mold unit of the at least one modular system having a third length greater than the second length.

In some embodiments, the front cage mold unit of the at least one modular system may correspond to a front cage of the first monocoque that defines an operator cabin of the first land vehicle, the selected first mold unit of the at least one modular system may have a first length and correspond to an intermediate section of the first monocoque that is positioned rearward of the front cage of the first monocoque, the front cage mold unit of the at least one modular system may correspond to a front cage of the second monocoque that defines an operator cabin of the second land vehicle, and the selected first mold unit of the at least one modular system may have a second length different from the first length and correspond to an intermediate section of the second monocoque that is positioned rearward of the front cage of the second monocoque. The method may further include the following: selecting a second mold unit of the at least one modular system corresponding to a rear floor of the first monocoque that is positioned rearward of the front cage and the intermediate section of the first monocoque based upon the selected first monocoque configuration; coupling the selected first mold unit of the at least one modular system to the selected second mold unit of the at least one modular system such that the front cage mold cavity of the front cage mold unit of the at least one modular system, the cavity of the selected first mold unit of the at least one modular system, and a mold cavity of the selected second mold unit of the at least one modular system are fluidly coupled to one another to establish the first continuous monocoque mold cavity; selecting a second mold unit of the at least one modular system corresponding to a rear floor of the second monocoque that is positioned rearward of the front cage and the intermediate section of the second monocoque based upon the selected second monocoque configuration; and coupling the selected first mold unit of the at least one modular system to the selected second mold unit of the at least one modular system such that the front cage mold cavity of the front cage mold unit of the at least one modular system, the cavity of the selected first mold unit of the at least one modular system, and a mold cavity of the selected second mold unit of the at least one modular system are fluidly coupled to one another to establish the second continuous monocoque mold cavity.

According to a further aspect of the present disclosure still, a method of forming multiple monocoques of land vehicles using at least one modular system includes the following: selecting a first monocoque configuration for a first monocoque of a first land vehicle; selecting a first mold unit of at least one modular system based upon the selected first monocoque configuration; coupling the selected first mold unit to a front cage mold unit of the at least one modular system such that a front cage mold cavity of the front cage mold unit is fluidly coupled to a mold cavity of the selected first mold unit to at least partially establish a first continuous monocoque mold cavity; introducing one or more composite materials into the first continuous monocoque mold cavity; curing the one or more composite materials in the first continuous monocoque mold cavity to form the first monocoque; selecting a second monocoque configuration for a second monocoque of a second land vehicle different from the first land vehicle; selecting a first mold unit of the at least one modular system based upon the selected second monocoque configuration that is different from the selected first mold unit of the at least one modular system; coupling the selected first mold unit of the at least one modular system to a front cage mold unit of the at least one modular system such that a front cage mold cavity of the front cage mold unit of the at least one modular system is fluidly coupled to a mold cavity of the selected first mold unit of the at least one modular system to at least partially establish a second continuous monocoque mold cavity; introducing one or more composite materials into the second continuous monocoque mold cavity; curing the one or more composite materials in the second continuous monocoque mold cavity to form the second monocoque; selecting a third monocoque configuration for a third monocoque of a third land vehicle different from the first land vehicle and the second land vehicle; selecting a first mold unit of the at least one modular system based upon the selected third monocoque configuration that is different from the selected first mold unit of the at least one modular system and the selected first mold unit of the at least one modular system; coupling the selected first mold unit of the at least one modular system to a front cage mold unit of the at least one modular system such that a front cage mold cavity of the front cage mold unit of the at least one modular system is fluidly coupled to a mold cavity of the selected first mold unit of the at least one modular system to at least partially establish a third continuous monocoque mold cavity; introducing one or more composite materials into the third continuous monocoque mold cavity; and curing the one or more composite materials in the third continuous monocoque mold cavity to form the third monocoque.

Further still, according to another aspect of the present disclosure, a land vehicle may include a monocoque supporting a plurality of wheels to permit movement of the vehicle relative to an underlying surface in use of the land vehicle. The monocoque may be a single-piece, monolithic structure unsupported by an internal chassis. The monocoque may include a front cage defining an operator cabin and a rear floor positioned rearward of the front cage. The monocoque may have a composite construction such that each of the front cage and the rear floor are formed from one or more composite materials. The monocoque may not include metallic material In some embodiments, the monocoque may include a core and a shell that at least partially surrounds the core, the core may be formed from balsa wood and plastic, and the shell may be formed from resin and fiberglass. The monocoque may include an intermediate section disposed between the front cage and the rear floor, the vehicle may include a stowage compartment at least partially defined by the intermediate section and the rear floor that has a plurality of sidewalls and a ceiling, each of the intermediate section, the plurality of sidewalls, and the ceiling may be formed from one or more composite materials, and each of the intermediate section, the plurality of sidewalls, and the ceiling may not include metallic material. The vehicle may not include an internal combustion engine. A height of the rear floor above the underlying surface may be between 22 inches and 28 inches These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a partial schematic rear end view of a conventional delivery vehicle;

FIG. 5 is a partial schematic rear end view of a delivery vehicle according to at least one embodiment of the disclosure;

FIG. 6 is a table illustrating United States standard vehicle classes by gross vehicular weight rating (GVWR);

DETAILED DESCRIPTION OF ILLUSTRATIVE EMBODIMENTS

Figure 1:
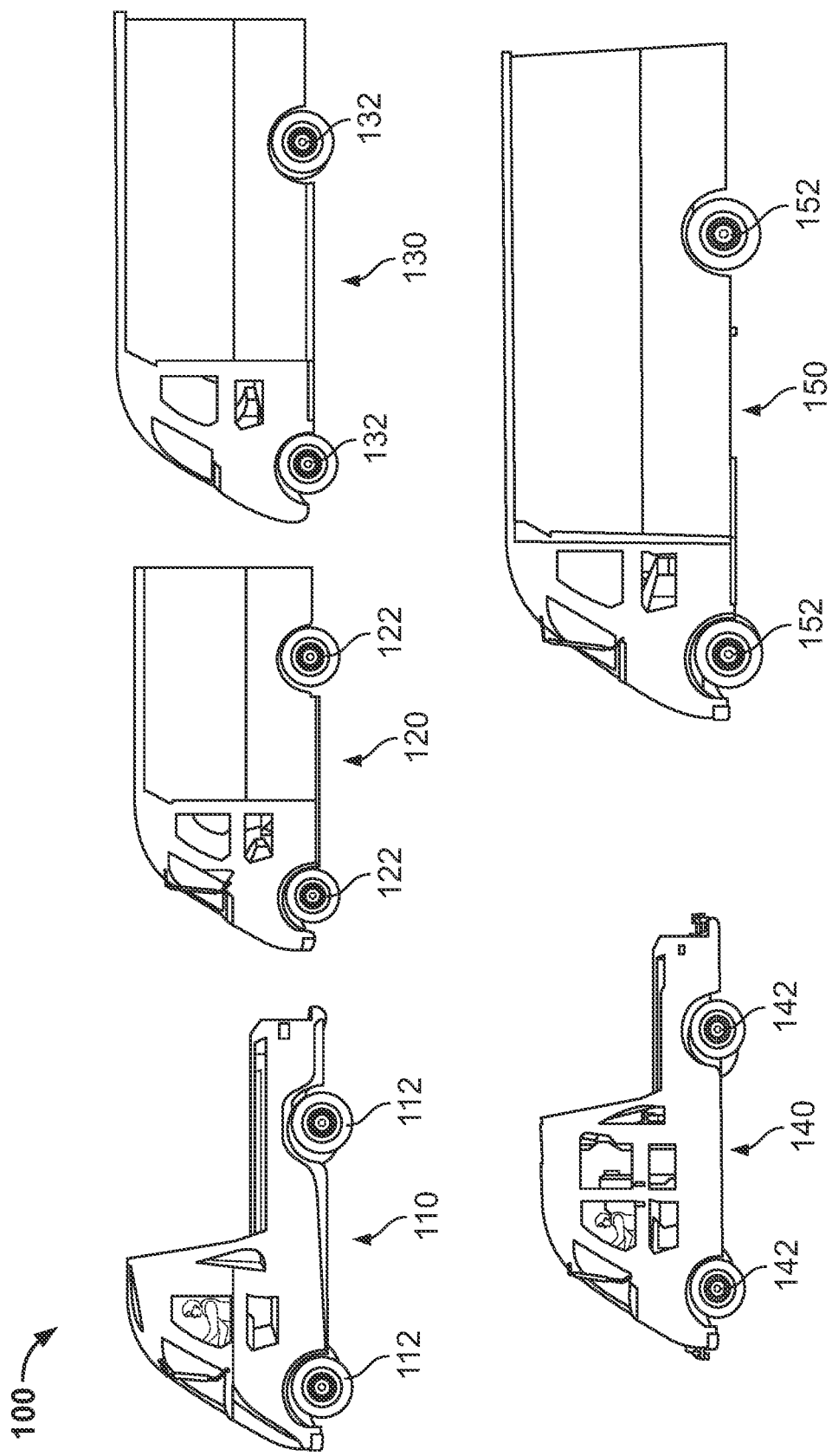
FIG. 1 depicts side elevation views of a number of electric vehicles that may be included in an electric vehicle line according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110, a 650 cubic foot capacity delivery vehicle 120, a 1000 cubic foot capacity delivery vehicle 130, a six-passenger flatbed utility vehicle 140, and a 1200 cubic foot capacity delivery vehicle 150. However, in some embodiments, the land vehicle line 100 may include any vehicle having a capacity within a particular range, such as a range of from 400 cubic feet to 1400 cubic feet, for example. In keeping with industry terminology, the phrase "cubic foot capacity" may be shortened or abbreviated herein to simply "cube." It should be appreciated that the phrase "cubic foot capacity" as contemplated herein may refer to a storage volume or storage capacity of a particular land vehicle. In any case, as will be apparent from the discussion that follows, one or more vehicles of the vehicle line 100 may be manufactured using the systems and methods described herein.

In the illustrative embodiment, each of the vehicles included in the vehicle line 100 (i.e., each of the vehicles 110, 120, 130, 140, 150) includes a monocoque or unibody 200 (see FIG. 2) supporting wheels (e.g., wheels 112, 122, 132, 142, 152) to permit movement of the particular vehicle relative to an underlying surface in use thereof. As described herein, the monocoque 200 is a single-piece, monolithic structure unsupported by an internal chassis. The monocoque 200 includes a front cage 210 defining an operator cabin 212 and a rear floor 220 positioned rearward of the front cage 210. The monocoque 200 illustratively has a composite construction (e.g., the composite structure 700 shown in FIG. 7) such that each of the front cage 210 and the rear floor 220 are formed from one or more composite materials, as described in greater detail below.

At least some of the vehicles (e.g., the vehicles 110, 140) of the illustrative line 100 may be embodied as, included in, or otherwise adapted for use with, electric utility vehicles. Furthermore, at least some of the vehicles (e.g., the vehicles 120, 130, 150) of the illustrative line 100 may be embodied as, included in, or otherwise adapted for use with, electric vehicles having enclosed stowage compartments. Of course, in other embodiments, it should be appreciated that the vehicles of the line 100 may be embodied as, included in, or otherwise adapted for use with, other suitable vehicles.

It should be appreciated each of the vehicles of the illustrative line 100 may be employed in a variety of applications. In some embodiments, one or more vehicles of the line 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, one or more vehicles of the line 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, each of the vehicles of the line 100 includes one or more electric motors (not shown) capable of generating rotational power that may be transmitted to the wheels to drive movement of the vehicle. As such, each of the illustrative vehicles is embodied as, or otherwise includes, an electric vehicle. Details regarding the electric motor(s) included in each vehicle and associated powertrain and/or suspension components are described in U.S. patent application Ser. No. 17/142,814, the contents of which are incorporated herein by reference in their entirety.

Each of the vehicles of the illustrative line 100 does not include an internal combustion engine or powerplant, at least in some embodiments. Furthermore, each of the vehicles of the illustrative line 100 does not include an engine or powerplant housed by the front cage 210 and positioned above an underside 214 of the monocoque 200. Instead, as described in U.S. patent application Ser. No. 17/142,814, multiple electric motors or powerplants are removably coupled to the underside 214 of the monocoque 200 of each vehicle of the illustrative line 100.

It should be appreciated that the vehicles of the illustrative vehicle line 100 may each include one or more features that improve the experience of the driver, the owner, and/or maintenance personnel. Such features may include, but are not limited to, a low floor, a modular battery system, air springs and/or air ride features, an independent rear suspension, an independent front suspension, thermal battery management capability, flexible shelving options, desirable driver sightlines, LED lighting, telematics/driver feedback, features to facilitate maintenance, an aerodynamic body, and advanced safety systems. Further details regarding at least some of these features are provided herein.

Figure 2:
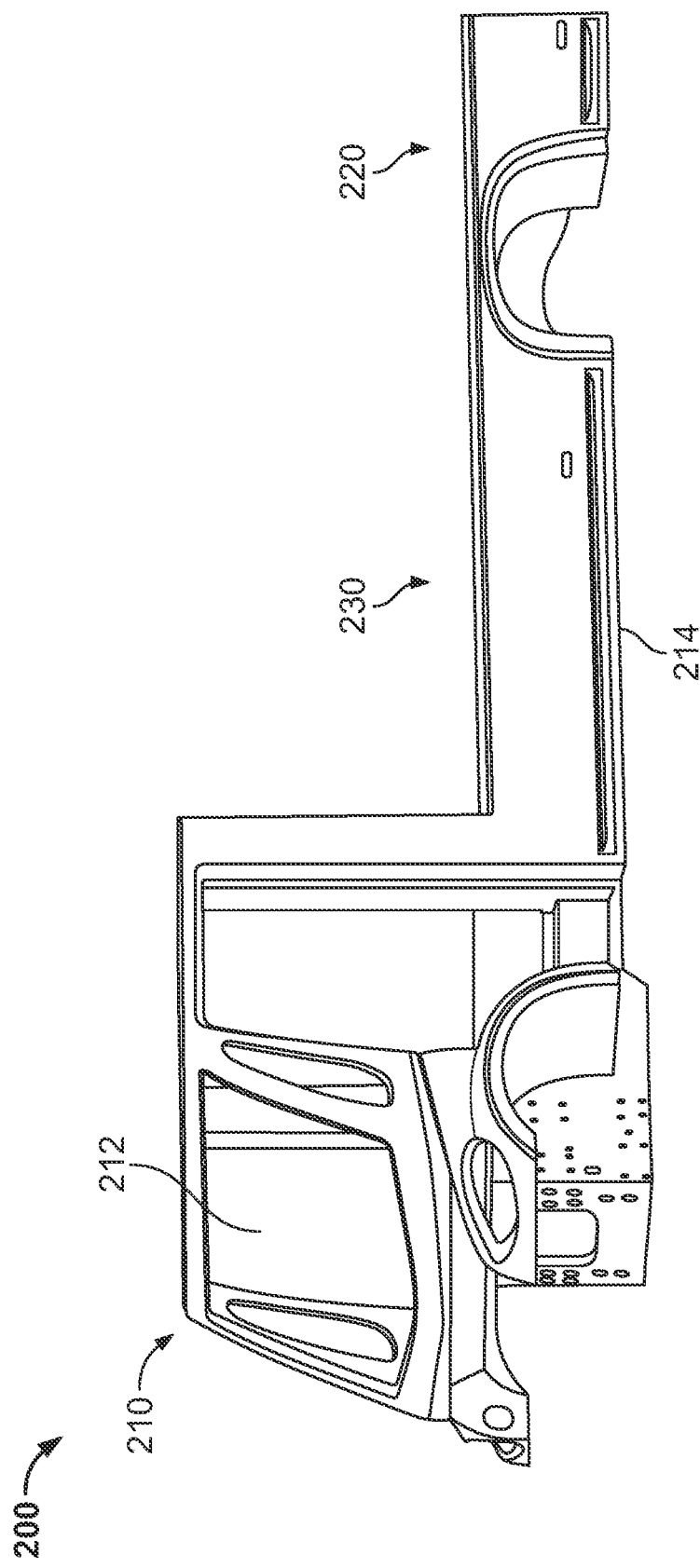
FIG. 2 is a perspective view of a monocoque or unibody that may be incorporated into any electric vehicle of the disclosure.

Referring now to FIG. 2, in addition to the front cage 210 and the rear floor 220, at least in some embodiments, the monocoque 200 includes an intermediate section 230 arranged between the front cage 210 and the rear floor 220. The intermediate section 230 may form a portion of a floor section arranged forward of the rear floor 220. As described in greater detail below with reference to FIG. 8, each of the front cage 210, the rear floor 220, and the intermediate section 230 may be associated with, and formed with, a corresponding mold unit of a modular mold system (e.g., the system 800). Furthermore, as described in greater detail below with reference to FIG. 9, the mold units of the modular mold system may be joined together to form a monocoque mold (e.g., the monocoque mold 900) into which composite materials may be introduced to form the monocoque 200.

In the illustrative embodiment, the monocoque 200 combines what would traditionally be formed from one or more separate structures (e.g., one or more body components and one or more frame components) into a single-piece, monolithic structure. As such, any vehicle of the present disclosure incorporating the monocoque 200 does not include an internal chassis or frame structure that supports separate body components (e.g., panels, doors, etc.). Due at least in part to consolidation of body and frame components into an integrally-formed structure, the illustrative monocoque 200 may be associated with, or otherwise facilitate, improved manufacturability and/or simplified maintenance compared to other configurations.

Depending on the particular vehicle type and monocoque configuration, one or more dimensions of the intermediate section 230 of the monocoque 200 may vary. In one example, the intermediate section 230 may have a first length associated with, and defined by, a small intermediate section mold unit (e.g., the mold unit 832 shown in FIG. 8). In that example, the first length of the intermediate section 230 may at least partially define a stowage compartment of a 650 cubic feet delivery vehicle (e.g., the vehicle 120). In another example, the intermediate section 230 may have a second length associated with, and defined by, a medium intermediate section mold unit (e.g., the mold unit 834 shown in FIG. 8). In that example, the second length of the intermediate section 230 may at least partially define a stowage compartment of a 1000 cubic feet delivery vehicle (e.g., the vehicle 130). In yet another example, the intermediate section 230 may have a third length associated with, and defined by, a large intermediate section mold unit (e.g., the mold unit 836 shown in FIG. 8). In that example, the third length of the intermediate section 230 may at least partially define a stowage compartment of a 1200 cubic feet delivery vehicle (e.g., the vehicle 150).

Furthermore, depending on the particular vehicle type and monocoque configuration, the intermediate section 230 of the monocoque 200 may be omitted entirely. In such embodiments, the front cage 210 and the rear floor 220 may be integrally-formed as a single-piece, monolithic structure without the intermediate section 230 interposed therebetween. It should be appreciated that the utility vehicles 110 and 140 may each include a monocoque formed without the intermediate section 230, at least in some embodiments.

Figure 3:
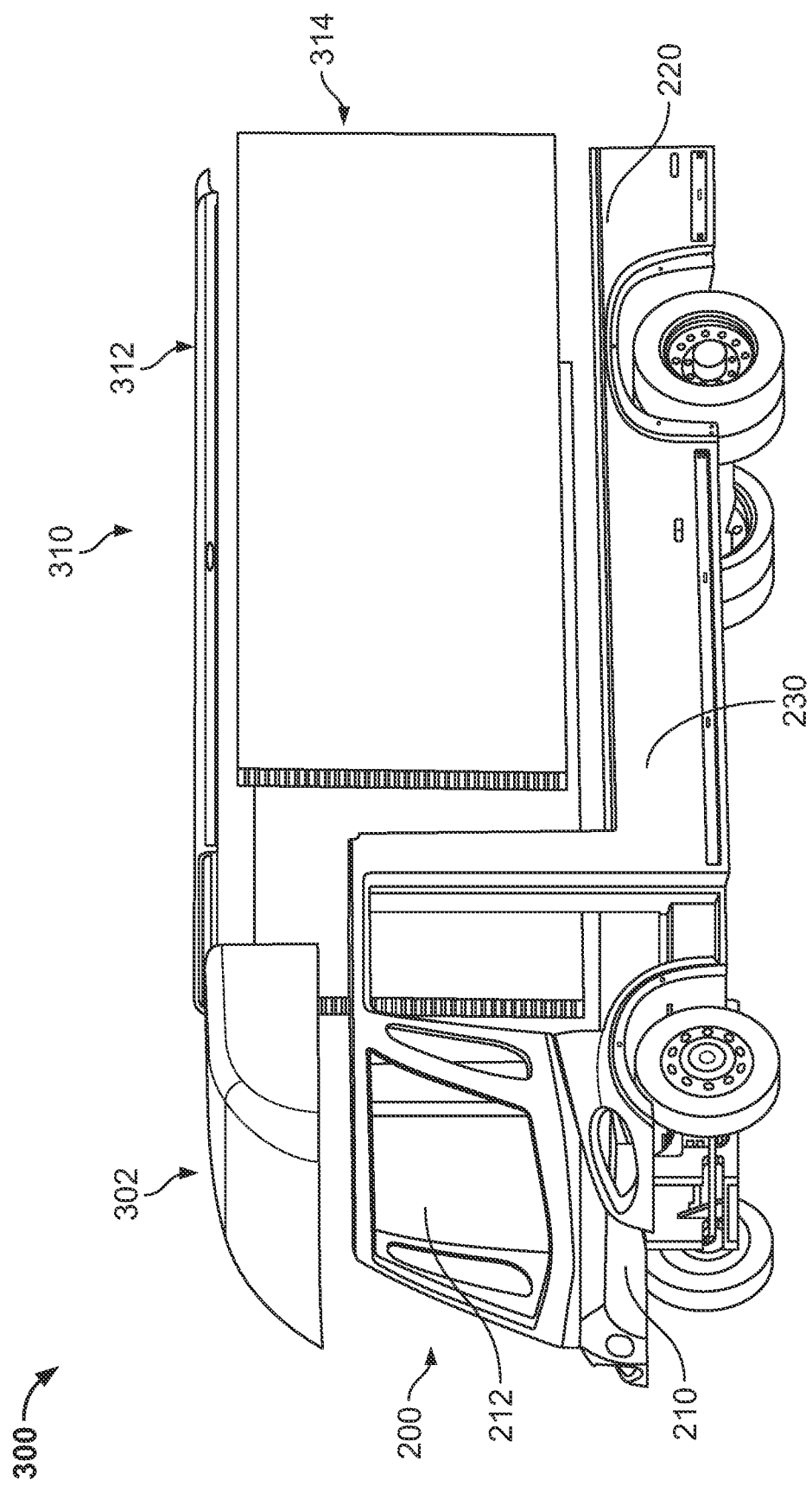
FIG. 3 is a partially exploded assembly view of an electric vehicle according to at least one embodiment of the disclosure.

Referring now to FIG. 3, a vehicle 300 incorporates the monocoque 200 with the intermediate section 230 arranged between the front cage 210 and the rear floor 220. Additionally, the vehicle 300 includes a cab hood 302 arranged above the front cage 210 to enclose the operator cabin 212 and a stowage compartment 310 arranged rearward of the front cage 210 and the cab hood 302. In the illustrative embodiment, the stowage compartment 310 is at least partially defined by the intermediate section 230 and the rear floor 220 and has a roof 312 and sidewalls 314. The illustrative vehicle 300 may be similar to any one of the vehicles 120, 130, 150 discussed above, at least in some embodiments.

Figure 7:
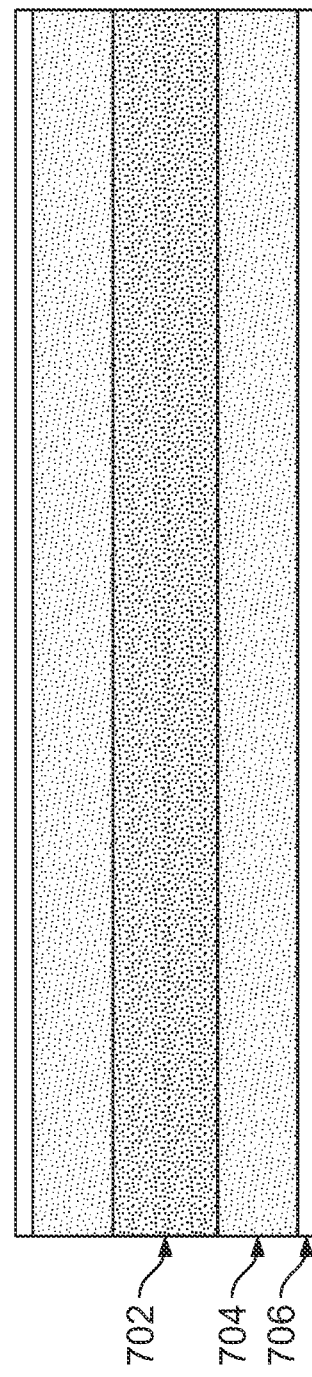
FIG. 7 is a partial schematic depiction of a composite structure that may be used to form a monocoque or unibody of any electric vehicle of the disclosure.

Because the monocoque 200 has a composite construction as indicated above, it should be appreciated that any vehicle described herein that incorporates the monocoque 200 (e.g., any of the vehicles 110, 120, 130, 140, 150, 300, 500) incorporates a composite structure (e.g., the structure 700 shown in FIG. 7). In the case of the vehicle 300, each of the intermediate section 230, the roof 312, and the sidewalls 314 is formed from composite materials and has a composite structure, at least in some embodiments. In those embodiments, each of the intermediate section 230, the roof 312, and the sidewalls 314 does not include metallic material.

Referring now to FIG. 4, a prior art delivery vehicle 400 includes a stowage compartment 410. The stowage compartment 410 includes a floor 412, a pair of sidewalls 414, a ceiling 416, and a refrigeration unit 418 at least partially housed by the stowage compartment 410 and configured to cool the stowage compartment 410. The rear end of the vehicle 400 includes a landing 404 and a step 406 that leads to the floor 412 of the stowage compartment 410.

As depicted in FIG. 4, the landing 404 has a landing height 424 above ground level 402 and the step 406 has a step height 426 above the landing 404. The floor 412 has a floor height 422 above the ground level 402 that includes both the landing height 424 and the step height 426. Typically, the landing height 424 is about 25 inches, the step height 426 is about ten inches, and the floor height 422 is about 35 inches.

Referring now to FIG. 5, a delivery vehicle 500 may include a monocoque (e.g., the monocoque 200) described above with reference to FIG. 2. Furthermore, in some embodiments, the vehicle 500 may be similar to one or more of the vehicles 120, 130, 150 described above. In any case, the illustrative delivery vehicle 500 includes a stowage compartment 510 having a floor 512, a pair of sidewalls 514, and a ceiling 516, as well as a refrigeration unit 518 housed by the stowage compartment 510. Unlike the prior art delivery vehicle 400, however, the vehicle 500 lacks a step corresponding to the step 406. As such, the floor 512 has a floor height 522 that substantially corresponds to, and may be equal to, the landing height 424. The floor height 522 may be less than thirty inches, such as in the range of 22 to 28 inches, for example. A pair of wheel wells 530 formed within the stowage compartment 510 are offset from one another by a separation distance 532. In certain embodiments, the separation distance 532 may be about 50 inches.

In some cases, the prior art delivery vehicle 400 suffers from one or more disadvantages not associated with the illustrative vehicle 500. In one respect, the sidewalls 414 and the ceiling 416 of the prior art vehicle 400 are typically formed of metallic material such as aluminum, for example, which is a poor thermal insulator. As such, the compartment 410 may be poorly insulated and have a tendency to adopt the temperature of the ambient environment relatively quickly. That may be especially the case in the summer when radiant heat from the sun supplements the ambient hot air to exacerbate the warming of the compartment 410. In contrast, the sidewalls 514 and the ceiling 516 of the illustrative vehicle 500 are formed of composite materials, which exhibit superior insulating characteristics compared to metallic material such as aluminum. Accordingly, the compartment 510 is insulated from the ambient environment to a greater degree than the compartment 410. That insulation may be particularly advantageous in cases in which the vehicle 500 is a refrigerated vehicle such as a food delivery vehicle, for instance. It should be appreciated that the insulating properties of the compartment 510 may ease the cooling burden on the refrigeration unit 518 and thereby increase performance of the refrigeration unit 518. Additionally, in certain circumstances, increased performance of the refrigeration unit 518 may enable the vehicle 500 to be provided with a smaller refrigeration unit 518 than would typically be required by the prior art vehicle 400.

Another drawback associated with the prior art vehicle 400 is the elevated nature of the floor 412 relative to the ground level 402. It should be appreciated that the elevated floor 412 is not merely a design choice but rather a feature often necessitated to accommodate inclusion of the internal chassis or frame, the powertrain, and associated components. Put another way, to accommodate the mounting of a conventional internal combustion engine and other powertrain components (e.g., a transmission, transaxle, and/or a differential) to an internal chassis, the floor 412 is elevated above the ground level 402 by the floor height 422. Consequently, the elevated floor 412 reduces the storage capacity and/or volume of the stowage compartment 410 and requires the provision of the step 406. Delivery personnel using the vehicle 400 must therefore step up onto the landing 404 and ascend the step 406 in order to access the compartment 410.

The illustrative vehicle 500 obviates a number of the aforementioned disadvantages by eliminating the necessity of the elevated floor 412. Due in part to the provision of the monocoque 200 as a single-piece, monolithically formed structure having a relatively lightweight composite construction, and due in part to the absence of powertrain components typically provided in other configurations (e.g., a central drive shaft beneath the underside 214 of the monocoque 200 that provides a rotational input to a differential), the floor 512 need not be elevated above the ground level like the floor 412. As a result, the vehicle 500 allows increased stowage capacity of the stowage compartment 510 to be achieved without raising the ceiling 516. Moreover, because a step similar to the step 406 may be omitted from the vehicle 500, the floor height 522 corresponds to the landing height 424 of the conventional vehicle 400, and delivery personnel may avoid the effort of ascending both the landing 404 and the step 406 to access the stowage compartment 510 of the vehicle 500. Notably, it should be appreciated that a rear bumper of the vehicle 500 may be slightly lower than the floor 512 and that delivery personnel may access the compartment 510 by first stepping on the rear bumper. In some embodiments, the rear bumper may have a height of about 20 inches above the ground level, whereas the floor 512 may have a height of about 25 inches above the ground level.

Referring now to FIG. 6, in the United States, trucks are often classified according to their gross vehicular weight rating (GVWR). Those truck classifications, the associated duty classifications, and the corresponding GVWRs are illustrated in the table 600. In the illustrative embodiment, one or more of the vehicles 110, 120, 130, 140, 150 has a GVWR (i.e., accounting for the weight of the truck when empty and the payload carrying capacity of the truck when full) of between 6,000 pounds and 19,800 pounds. In some embodiments, one or more of the vehicles 110, 120, 130, 140, 150 has a GVWR of between 10,001 pounds and 14,000 pounds such that one or more of the vehicles 110, 120, 130, 140, 150 is embodied as, or otherwise includes, a Class 3 truck. In one particular example, in some embodiments, the 1000 cubic foot capacity vehicle 130 weighs roughly 6,500 pounds when empty and has a 6,000 pound payload capacity such that the vehicle 130 has a GVWR of about 12,500 pounds. Of course, it should be appreciated that in other embodiments, the vehicle line 100 may include one or more vehicles in Class 3, one or more vehicles in Class 4, and/or one or more vehicles in Class 5.

In some embodiments, the systems and methods described herein may find particular utility in connection with delivery vehicles in Classes 3 through 5. For example, the methods 1000, 1100, 1300 described below may be utilized to form a monocoque for a delivery vehicle having a GVWR between 10,001 pounds and 19,500 pounds. The stowage capacity of such a vehicle may be between 450 cubic feet and 1200 cubic feet. In certain embodiments, the stowage compartment (e.g., the compartment 510) of the vehicle may be isolated from the operator cabin (e.g., the operator cabin 212) of the vehicle.

Referring now to FIG. 7, any vehicle of the present disclosure includes a monocoque having the composite structure 700. In the illustrative embodiment, the composite structure 700 incorporates one or more relatively lightweight, low-density materials to impart a relatively lightweight construction to the vehicle. As discussed below, the illustrative composite structure 700 includes one or more of the following: balsa wood, plastic, fiberglass, resin, Kevlar, honeycomb, and carbon fiber. The composite structure 700 does not include, and is not formed from, metallic material, at least in some embodiments. In those embodiments, the monocoque (e.g., the monocoque 200) incorporating the composite structure 700 does not include metallic material.

The illustrative composite structure 700 includes a core 702 and a shell 704 that at least partially surrounds the core 702. In the illustrative embodiment, the core 702 is formed from balsa wood and/or one or more of the following composite, non-metallic materials: unidirectional fiberglass, multi-directional fiberglass, Kevlar, carbon fiber, plastic, honeycomb, or other suitable composite, non-metallic materials. Of course, in other embodiments, the core 702 may be formed from other suitable materials to provide a relatively lightweight construction to the composite structure 700. The illustrative shell 704 is formed from fiberglass and resin. However, in other embodiments, the shell 704 may be formed from other suitable materials. Additionally, in the illustrative embodiment, the composite structure 700 includes a laminate layer 706 that at least partially covers the shell 704.

It should be appreciated that the composite structure 700 used to form the monocoque of any vehicle of the present disclosure offers a number of advantages over multi-piece metallic constructions of conventional vehicles. In one respect, the single-piece monolithic structure formed with the composite structure 700 has fewer parts and offers greater structural simplicity than vehicle constructions requiring multiple parts. In another respect, the structural simplicity afforded by the composite structure 700 may facilitate maintenance and improve structural efficiency. In yet another respect, due to a lack of metallic material, the composite structure 700 may minimize or eliminate rust and/or corrosion and thereby have a service life that exceeds the service life of vehicles having conventional constructions. In some instances, monocoques incorporating composite structures 700 consistent with the teachings of the present disclosure may have service lives of 20 years or more.

Figure 8:
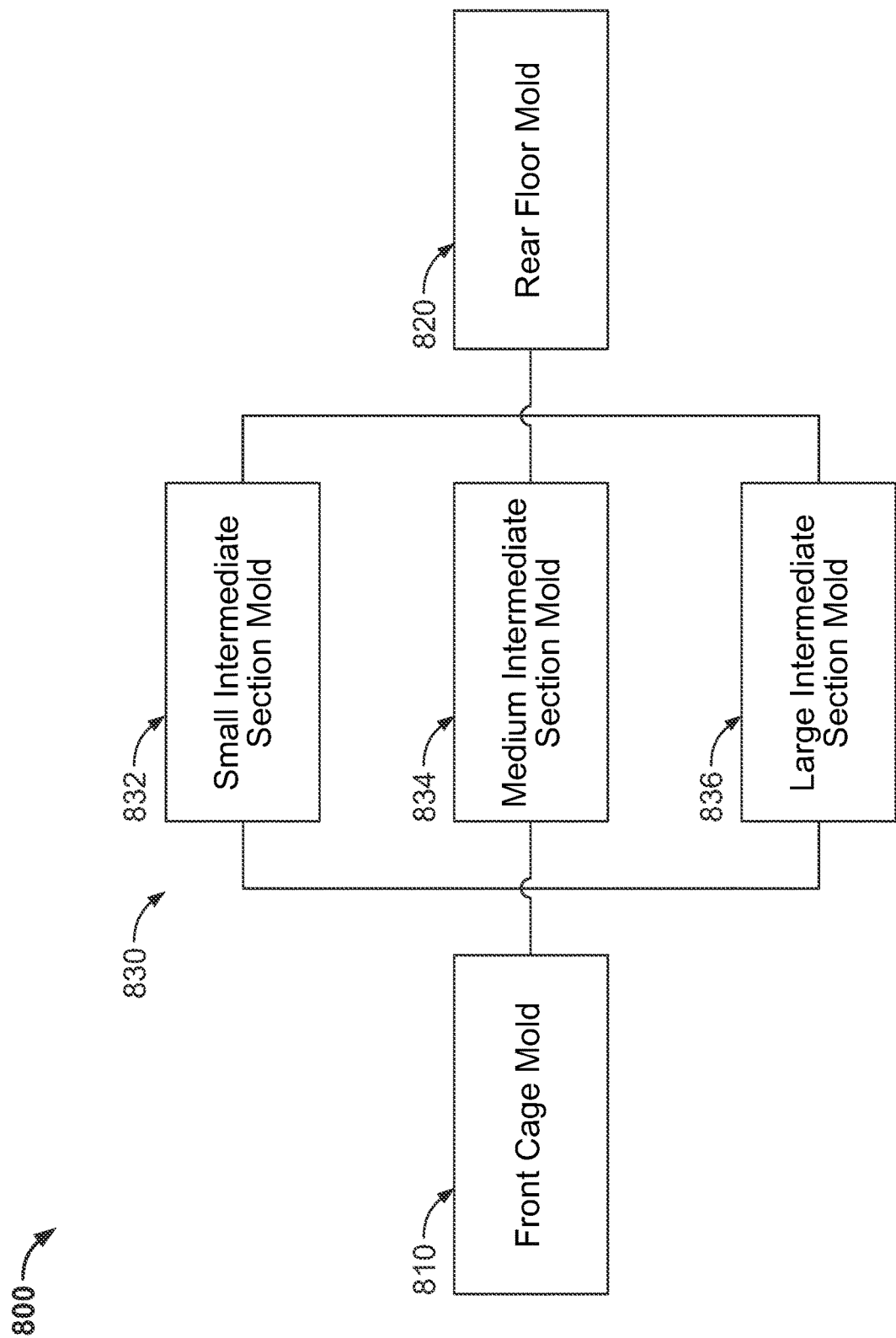
FIG. 8 is a diagrammatic depiction of at least one modular mold system according to certain embodiments of the disclosure.
Figure 9:
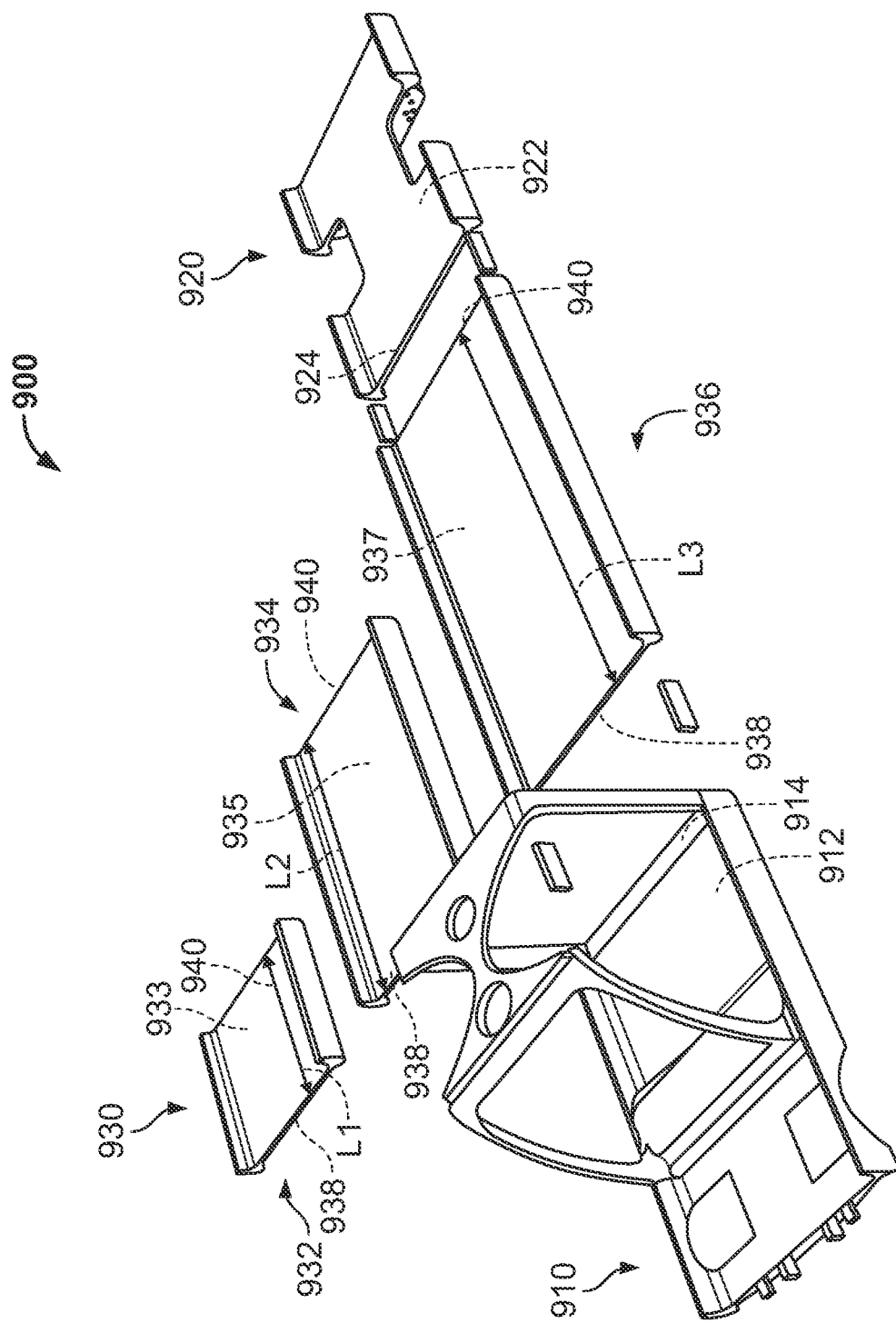
FIG. 9 is a perspective view of a monocoque system formed from a number of mold units included in the at least one modular mold system of FIG. 8.

Referring now to FIGS. 8 and 9, a modular mold system 800 (see FIG. 8) includes a number of illustrative mold units that may be selected and arranged to form a monocoque system 900 (see FIG. 9). It should be appreciated that when arranged to form the monocoque system 900, the selected mold units of the modular system 800 are utilized to form a monocoque such as the above-described monocoque 200, for example. Furthermore, it should be appreciated that similar reference numerals in the 800 and 900 series are used to designate corresponding features of the modular mold system 800 and the monocoque system 900.

The illustrative mold system 800 includes a front cage mold unit 810, a rear floor mold unit 820, and a plurality of intermediate mold units 830 having a small intermediate section mold unit 832, a medium intermediate section mold unit 834, and a large intermediate section mold unit 836. As discussed below, each of the mold units 810, 820, 832, 834, 836 has a mold cavity having a size and a shape corresponding to a corresponding feature of the monocoque system 900 such that subsequent to introduction of the composite materials (e.g., the materials of the composite structure 700) into the mold cavity, the corresponding feature of the monocoque system 900 will be formed. Accordingly, the front cage mold unit 810 includes a front cage mold cavity 912 that has a size and a shape corresponding to the front cage 910 of the monocoque system 900 (and also the front cage 210). The rear floor mold unit 820 includes a rear floor mold cavity 922 that has a size and a shape corresponding to the rear floor 920 of the monocoque system 900 (and also the rear floor 220). The intermediate mold units 832, 834, 836 include respective intermediate mold cavities 933, 935, 937 each having a size and a shape corresponding to the respective intermediate section 932, 934, 936 of the monocoque system 900 (and also the intermediate section 230).

As evident from FIGS. 8 and 9, each of the intermediate mold units 832, 834, 836 is sized for positioning between the front cage mold unit 810 and the rear floor mold unit 820 to form the monocoque system 900. It should be appreciated that any one of the intermediate mold units 832, 834, 836 may be selected and arranged between the front cage mold unit 810 and the rear floor mold unit 820 to form the monocoque system 900. Selection of the particular mold unit 832, 834, 836 is based on the configuration of the vehicle and the monocoque included therein, as further discussed below.

In the illustrative embodiment, the front cage mold cavity 912 of the front cage mold unit 810 has an opening 914 at a rear end thereof (i.e., the end closest to one of the intermediate sections 932, 934, 936 as shown in FIG. 9) to establish a fluidic coupling between the cavity 912 and another component of the mold system 800. In some embodiments, a fluidic coupling may be established between the front cage mold cavity 912 and one of the intermediate mold cavities 933, 935, 937 when the front cage mold unit 810 is arranged contiguously with one of the corresponding intermediate mold units 832, 834, 836. Additionally, in some embodiments, a fluidic coupling may be established between the front cage mold cavity 912 and the rear floor mold cavity 922 when the front cage mold unit 810 is arranged contiguously with the rear floor mold unit 820.

In the illustrative embodiment, the rear floor mold cavity 922 of the rear floor mold unit 820 has an opening 924 at a front end thereof (i.e., the end closest to one of the intermediate sections 932, 934, 936 as shown in FIG. 9) to establish a fluidic coupling between the cavity 922 and another component of the mold system 800. Each of the intermediate mold cavities 933, 935, 937 of the intermediate mold units 832, 834, 836 has an opening 938 at a front end thereof (i.e., the end closest to the front cage 910 as shown in FIG. 9) and an opening 940 at a rear end thereof (i.e., the end closest to the rear floor 920 as shown in FIG. 9). When one of the intermediate mold units 832, 834, 836 is arranged contiguously with the front cage mold unit 810, a fluidic coupling is established between the corresponding intermediate mold cavity 933, 935, 937 and the front cage mold cavity 912 via the openings 914, 938. Additionally, when one of the intermediate mold units 832, 834, 836 is arranged contiguously with the rear floor mold unit 820, a fluidic coupling is established between the corresponding intermediate mold cavity 933, 935, 937 and the rear floor mold cavity 922 via the openings 924, 940.

It should be appreciated that the front end of each of the illustrative intermediate mold units 832, 834, 836 is configured for direct connection and attachment to the rear end of the front cage mold unit 810. Furthermore, it should be appreciated that the rear end of each of the illustrative intermediate mold units 832, 834, 836 is configured for direct connection and attachment to the front end of the rear floor mold unit 820. Consequently, when any one of the intermediate mold units 832, 834, 836 is directly connected with the front cage mold unit 810 and the rear floor mold unit 820, the front cage mold cavity 912, the corresponding intermediate mold cavity 933, 935, 937, and the rear floor mold cavity 922 are fluidically coupled to one another in a contiguous arrangement to establish a continuous monocoque mold cavity into which composite materials may be introduced to form the monocoque as a single-piece, monolithic structure.

It should also be apparent that the rear end of the illustrative front cage mold unit 810 is configured for direct connection and attachment to the front end of the rear floor mold unit 820. As a result, when the front cage mold unit 810 is directly connected to the rear floor mold unit 820, the front cage mold unit 810 and the rear floor mold unit 820 are fluidically coupled to one another in a contiguous arrangement to establish a continuous monocoque mold cavity into which composite materials may be introduced to form the monocoque as a single-piece, monolithic structure.

In the illustrative embodiment, the small intermediate section mold unit 832 has a length L1 as suggested by FIG. 9. The medium intermediate section mold unit 834 has a length L2 that is greater than the length L1, at least in some embodiments. The large intermediate section mold unit 836 has a length L3 that is greater than the length L2 and the length L1, at least in some embodiments.

In some embodiments, the small intermediate section mold unit 832 may be used to form the intermediate section 932 of the monocoque system 900 such that the monocoque at least partially produced using the mold unit 832 is included in a vehicle having a storage volume of 650 cubic feet (e.g., the vehicle 120). Additionally, in some embodiments, the medium intermediate section mold unit 834 may be used to form the intermediate section 934 of the monocoque system 900 such that the monocoque at least partially produced using the mold unit 834 is included in a vehicle having a storage volume of 1000 cubic feet (e.g., the vehicle 130). In some embodiments still, the large intermediate section mold unit 836 may be used to form the intermediate section 936 of the monocoque system 900 such that the monocoque at least partially produced using the mold unit 836 is included in a vehicle having a storage volume of 1200 cubic feet (e.g., the vehicle 150).

Figure 10:
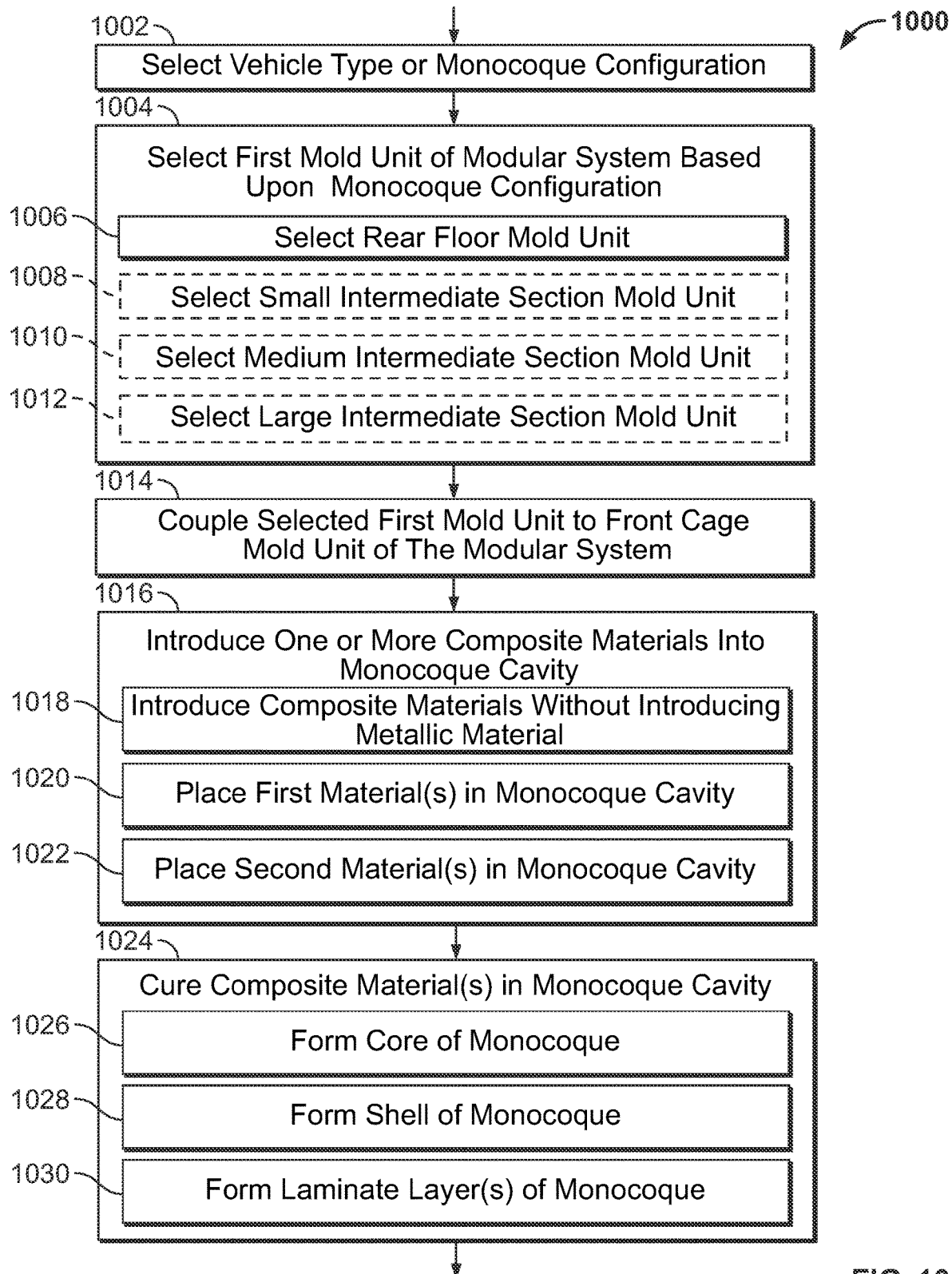
FIG. 10 is a simplified flowchart of a method of forming a monocoque of an electric vehicle using one modular mold system according to one embodiment of the disclosure.

Referring now to FIG. 10, an illustrative method 1000 of forming a monocoque (e.g., the monocoque 200) using a modular mold system (e.g., the system 800) is depicted. The method 1000 corresponds to, or is otherwise associated with, performance of the blocks described below in the illustrative sequence of FIG. 10. It should be appreciated, however, that the method 1000 may be performed in one or more sequences different from the illustrative sequence. Furthermore, it should be appreciated that one or more of the blocks described below may be executed contemporaneously and/or in parallel with one another. In some embodiments, the method 1000 may be performed manually by one or more operators. In other embodiments, the method 1000 may be embodied as, or otherwise include, a set of instructions that are performed by an automated control system.

The illustrative method 1000 begins with block 1002. In block 1002, the operator(s) or the control system selects a land vehicle type or a monocoque configuration for a particular land vehicle. It should be appreciated that to perform block 1002, the operator(s) or the control system may select any vehicle envisioned by the present disclosure or any monocoque configuration associated with a particular vehicle contemplated by the present disclosure. From block 1002, the method 1000 subsequently proceeds to block 1004.

In block 1004 of the illustrative method 1000, the operator(s) or the control system selects a first mold unit of the modular mold system based upon the selected vehicle type or monocoque configuration. In the illustrative embodiment, to perform block 1004, the operator(s) or the control system selects the rear floor mold unit 820 of the modular system 800 in block 1006. However, in other embodiments, it should be appreciated that block 1004 may be performed by selecting (i) the small intermediate section mold unit 832 (i.e., in block 1008), (ii) the medium intermediate section mold unit (i.e., in block 1010), or (iii) the large intermediate section mold unit 836 (i.e., in block 1012). Selection of one of the intermediate mold units 832, 834, 836 as the first mold unit is described in greater detail below with reference to FIG. 11. In any case, from block 1004, the method 1000 subsequently proceeds to block 1014.

In block 1014 of the illustrative method 1000, the operator(s) or the control system couples the selected first mold unit to the front cage mold unit 810 of the modular system 800. It should be appreciated that to perform block 1014, the selected first mold unit (i.e., the rear floor mold unit 820) is coupled to the front cage mold unit 810 such that the front cage mold cavity 912 is fluidly coupled to the rear floor mold cavity 922 to at least partially establish a continuous monocoque mold cavity. Following performance of block 1014, the method 1000 proceeds to block 1016.

In block 1016 of the illustrative method 1000, the operator(s) or the control system introduces one or more composite materials (e.g., the composite materials included in the composite structure 700) into the continuous monocoque mold cavity formed in block 1014. More specifically, to perform block 1016, at least in some embodiments, the operator(s) or the control system performs blocks 1018, 1020, and 1022. In block 1018, the operator(s) or the control system introduces one or more composite materials into the continuous monocoque mold cavity without introducing metallic material into the cavity. In other embodiments, however, block 1018 may be omitted from the method 1000. In block 1020, the operator(s) or the control system places a first material in the continuous monocoque mold cavity. The first material may include balsa wood and/or plastic, at least in some embodiments. In block 1022, the operator(s) or the control system places a second material different from the first material in the continuous monocoque mold cavity. The second material may include fiberglass and resin, at least in some embodiments. Following performance of block 1016, the method 1000 proceeds to block 1024.

In block 1024 of the illustrative method 1000, the operator(s) or the control system cures the one or more composite materials in the continuous monocoque mold cavity to form the monocoque. To perform block 1024, the operator(s) or the control system may perform blocks 1026, 1028, and 1030, at least in some embodiments. In block 1026, the operator(s) or the control system forms a core (e.g., the core 702) including the first material introduced in block 1016. In block 1028, the operator(s) or the control system forms a shell (e.g., the shell 704) including the second material introduced in block 1016 that at least partially surrounds the core. In block 1030, the operator(s) or the control system forms a laminate layer (e.g., the layer 706) that at least partially covers the shell.

Figure 11:
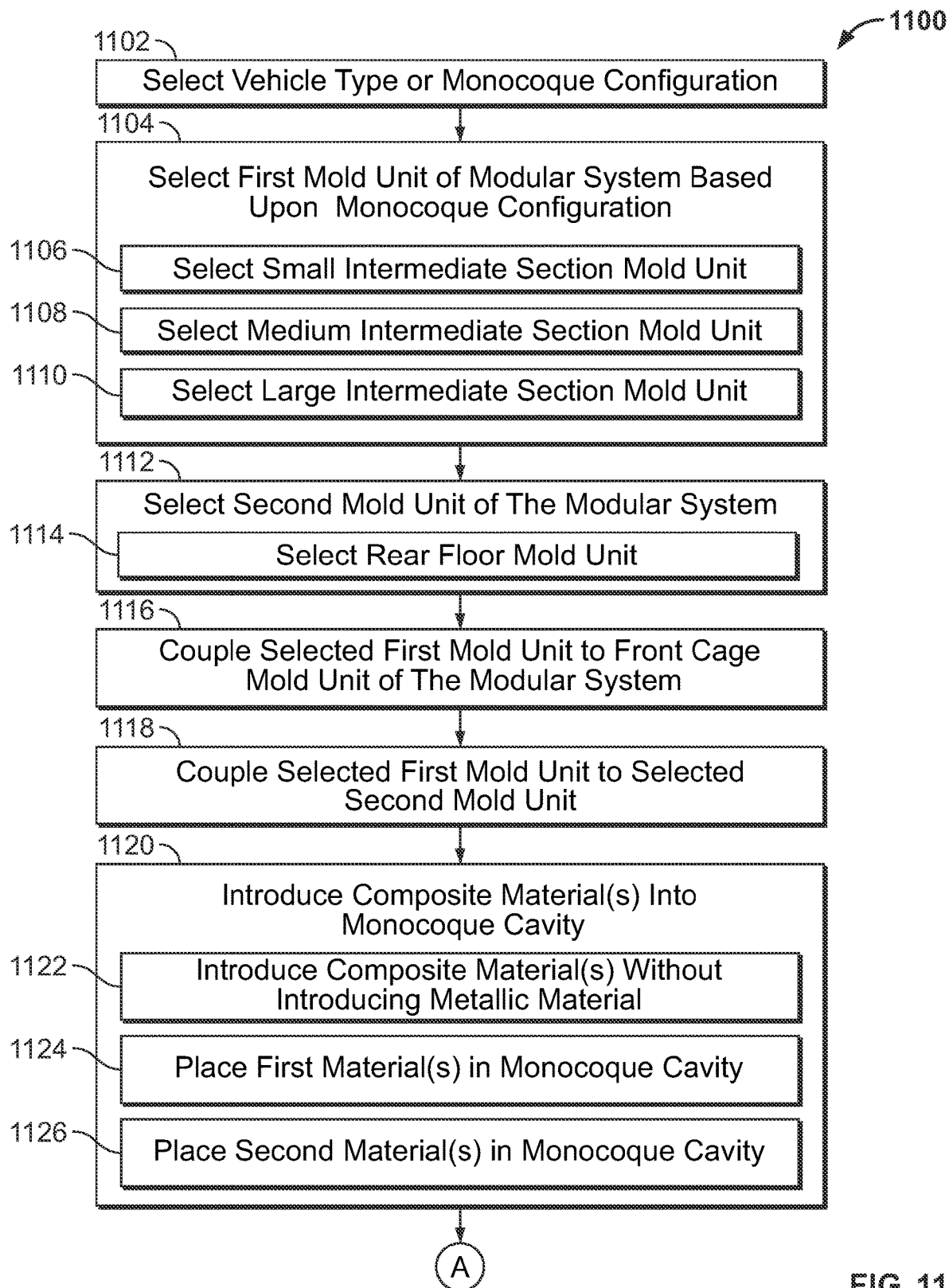
FIG. 11 is a simplified flowchart of one portion of another method of forming a monocoque of an electric vehicle using one modular mold system according to another embodiment of the disclosure.
Figure 12:
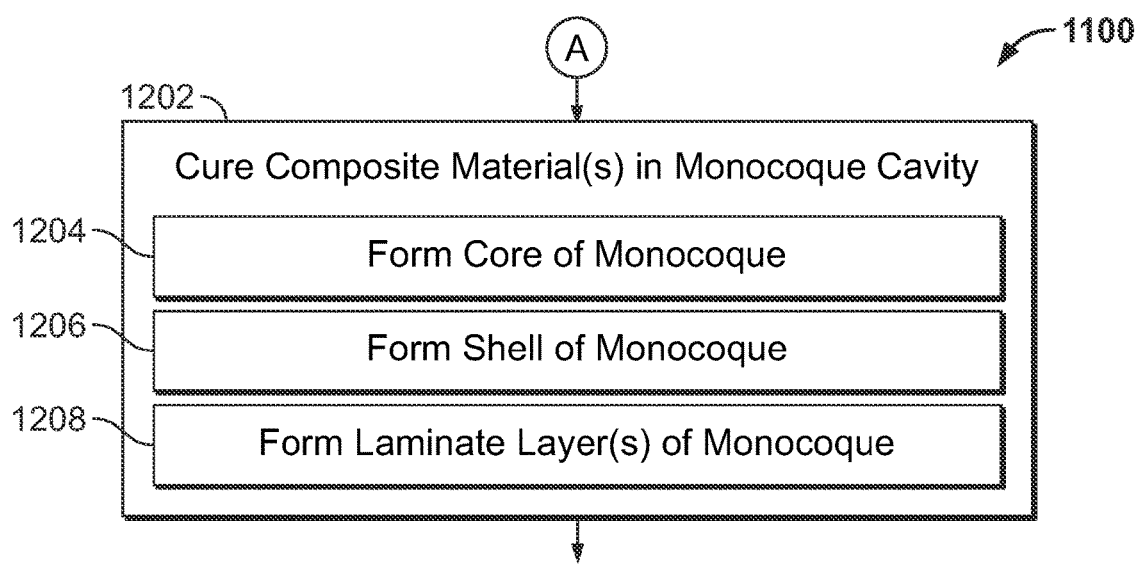
FIG. 12 is a diagrammatic view of another portion of the method of FIG. 11.

Referring now to FIGS. 11 and 12, an illustrative method 1100 of forming a monocoque (e.g., the monocoque 200) using a modular mold system (e.g., the system 800) is depicted. The method 1100 corresponds to, or is otherwise associated with, performance of the blocks described below in the illustrative sequence of FIGS. 11 and 12. It should be appreciated, however, that the method 1100 may be performed in one or more sequences different from the illustrative sequence. Furthermore, it should be appreciated that one or more of the blocks described below may be executed contemporaneously and/or in parallel with one another. In some embodiments, the method 1100 may be performed manually by one or more operators. In other embodiments, the method 1100 may be embodied as, or otherwise include, a set of instructions that are performed by an automated control system.

The illustrative method 1100 begins with block 1102. In block 1102, the operator(s) or the control system selects a land vehicle type or a monocoque configuration for a particular land vehicle. It should be appreciated that to perform block 1102, the operator(s) or the control system may select any vehicle envisioned by the present disclosure or any monocoque configuration associated with a particular vehicle contemplated by the present disclosure. From block 1102, the method 1100 subsequently proceeds to block 1104.

In block 1104 of the illustrative method 1100, the operator(s) or the control system selects a first mold unit of the modular mold system based upon the selected vehicle type or monocoque configuration. In the illustrative embodiment, to perform block 1104, the operator(s) or the control system performs one of blocks 1106, 1108, and 1110. In block 1106, the operator(s) or the control system selects the small intermediate section mold unit 832. In block 1108, the operator(s) or the control system selects the medium intermediate section mold unit 834. In block 1110, the operator(s) or the control system selects the large intermediate section mold unit 836. Following performance of block 1104, the method 1100 proceeds to block 1112.

In block 1112 of the illustrative method 1100, the operator(s) or the control system selects a second mold unit of the modular system. In the illustrative embodiment, to perform block 1112, the operator(s) or the control system performs block 1114. In block 1114, the operator(s) or the control system selects the rear floor mold unit 820 of the modular system 800. From block 1112, the method 1100 subsequently proceeds to block 1116.

In block 1116 of the illustrative method 1100, the operator(s) or the control system couples the selected first mold unit to the front cage mold unit 810 of the modular system 800. It should be appreciated that to perform block 1116, the selected first mold unit (i.e., one of the intermediate mold units 832, 834, 836) is coupled to the front cage mold unit 810 such that the front cage mold cavity 912 is fluidly coupled to the corresponding intermediate mold unit cavity (i.e., one of the cavities 933, 935, 937) to at least partially establish a continuous monocoque mold cavity. Following performance of block 1116, the method 1100 proceeds to block 1118.

In block 1118 of the illustrative method 1100, the operator(s) or the control system couples the selected first mold unit (i.e., one of the intermediate mold units 832, 834, 836) to the selected second mold unit (i.e., the rear floor mold unit 820). It should be appreciated that to perform block 1118, one of the intermediate mold units 832, 834, 836 is coupled to the rear floor mold unit 820 such that the rear floor mold cavity 922 is fluidly coupled to the corresponding intermediate mold unit cavity (i.e., one of the cavities 933, 935, 937) to at least partially establish the continuous monocoque mold cavity. Following performance of block 1118, the method 1100 proceeds to block 1120.

In block 1120 of the illustrative method 1100, the operator(s) or the control system introduces one or more composite materials (e.g., the composite materials included in the composite structure 700) into the continuous monocoque mold cavity formed in block 1118. More specifically, to perform block 1120, at least in some embodiments, the operator(s) or the control system performs blocks 1122, 1124, and 1126. In block 1122, the operator(s) or the control system introduces one or more composite materials into the continuous monocoque mold cavity without introducing metallic material into the cavity. In other embodiments, however, block 1122 may be omitted from the method 1100. In block 1124, the operator(s) or the control system places a first material in the continuous monocoque mold cavity. The first material may include balsa wood and/or plastic, at least in some embodiments. In block 1126, the operator(s) or the control system places a second material different from the first material in the continuous monocoque mold cavity. The second material may include fiberglass and resin, at least in some embodiments. Following performance of block 1120, the method 1000 proceeds to block 1202.

In block 1202 of the illustrative method 1100, the operator(s) or the control system cures the one or more composite materials in the continuous monocoque mold cavity to form the monocoque. To perform block 1202, the operator(s) or the control system may perform blocks 1204, 1206 and 1208, at least in some embodiments. In block 1204, the operator(s) or the control system forms a core (e.g., the core 702) including the first material introduced in block 1120. In block 1206, the operator(s) or the control system forms a shell (e.g., the shell 704) including the second material introduced in block 1120 that at least partially surrounds the core. In block 1208, the operator(s) or the control system forms a laminate layer (e.g., the layer 706) that at least partially covers the shell.

Figure 13:
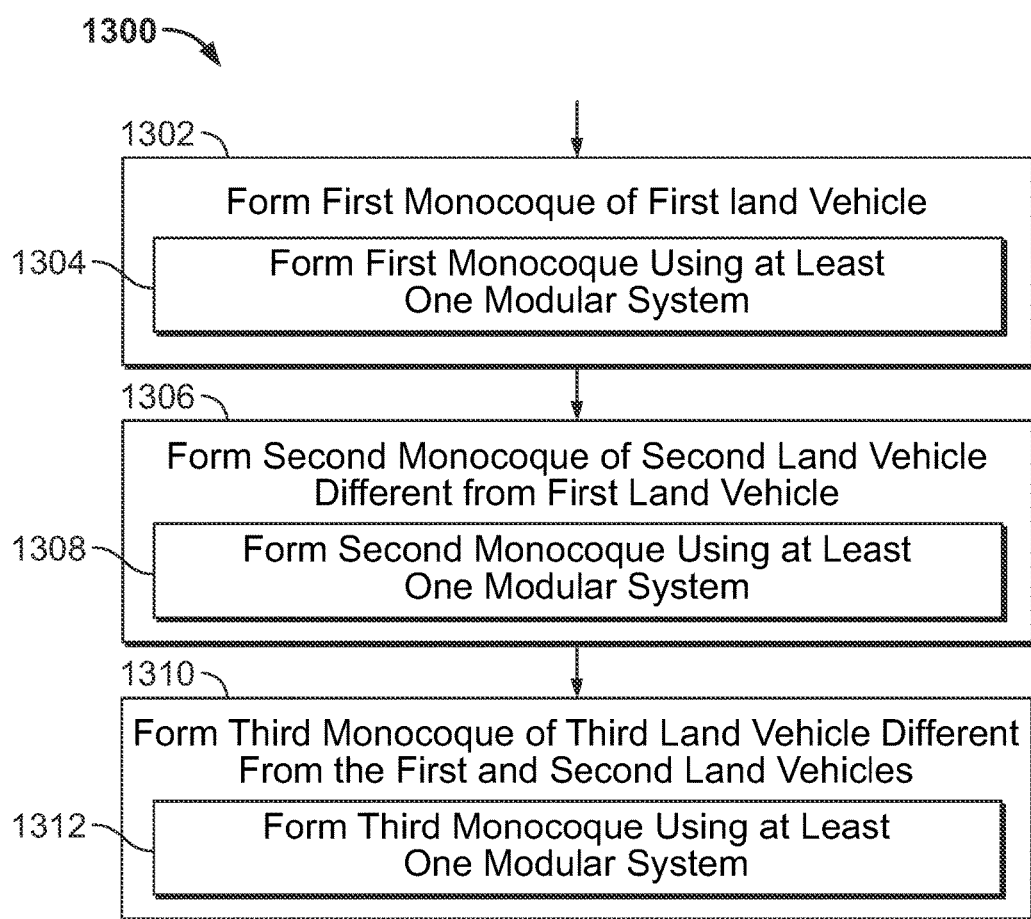
FIG. 13 is a simplified flowchart of a method of forming multiple monocoques of electric vehicles using at least one modular mold system according to yet another embodiment of the disclosure.

Referring now to FIG. 13, an illustrative method 1300 of forming multiple monocoques of land vehicles using at least one modular mold system is depicted. The method 1300 corresponds to, or is otherwise associated with, performance of the blocks described below in the illustrative sequence of FIG. 13. It should be appreciated, however, that the method 1300 may be performed in one or more sequences different from the illustrative sequence. Furthermore, it should be appreciated that one or more of the blocks described below may be executed contemporaneously and/or in parallel with one another. In some embodiments, the method 1300 may be performed manually by one or more operators. In other embodiments, the method 1300 may be embodied as, or otherwise include, a set of instructions that are performed by an automated control system.

The illustrative method 1300 begins with block 1302. In block 1302, the operator(s) or the control system forms a first monocoque of a first land vehicle. To perform block 1302, the operator(s) or the control system forms the first monocoque of the first land vehicle using at least one modular system (e.g., the system 800) in block 1304. In some embodiments, the first monocoque of the first land vehicle is formed using only the front cage mold unit 810 and the rear floor mold unit 820 of the modular system 800. In those embodiments, the first monocoque of the first land vehicle may be formed by performing the method 1000 described above. In other embodiments, the first monocoque of the first land vehicle is formed using the front cage mold unit 810, the rear floor mold unit 820, and one of the intermediate mold units 832, 834, 836. In those embodiments, the first monocoque of the first land vehicle may be formed by performing the method 1100 described above. In any case, following performance of block 1302, the method 1300 proceeds to block 1306.

In block 1306 of the illustrative method 1300, the operator(s) or the control system forms a second monocoque of a second land vehicle that is different from the first land vehicle. To perform block 1306, the operator(s) or the control system forms the second monocoque of the second land vehicle using at least one modular system (i.e., the system 800) in block 1308. In embodiments in which the first monocoque of the first land vehicle is formed in block 1302 using only the front cage mold unit 810 and the rear floor mold unit 820 of the modular system 800 (i.e., according to the method 1000), the second monocoque of the second land vehicle is formed using the front cage mold unit 810, the rear floor mold unit 820, and one of the intermediate mold units 832, 834, 836 (i.e., according to the method 1100). In embodiments in which the first monocoque of the first land vehicle is formed in block 1302 using the front cage mold unit 810, the rear floor mold unit 820, and a first one of the intermediate mold units 832, 834, 836 (i.e., according to the method 1100), the second monocoque of the second land vehicle is formed using the front cage mold unit 810, the rear floor mold unit 820, and a second one of the intermediate mold units 832, 834, 836 that is different from the first one. Regardless, from block 1306, the method 1300 subsequently proceeds to block 1310.

In block 1310 of the illustrative method 1300, the operator(s) or the control system forms a third monocoque of a third land vehicle that is different from the first land vehicle and the second land vehicle. To perform block 1310, the operator(s) or the control system forms the third monocoque of the third land vehicle using at least one modular system (i.e., the system 800) in block 1310. In embodiments in which (i) the first monocoque of the first land vehicle is formed in block 1302 using only the front cage mold unit 810 and the rear floor mold unit 820 of the modular system 800 (i.e., according to the method 1000) and (ii) the second monocoque of the second land vehicle is formed in block 1306 using the front cage mold unit 810, the rear floor mold unit 820, and a first one of the intermediate mold units 832, 834, 836 (i.e., according to the method 1100), the third monocoque of the third land vehicle is formed using the front cage mold unit 810, the rear floor mold unit 820, and a second one of the intermediate mold units 832, 834, 836 that is different from the first one. In embodiments in which (i) the first monocoque of the first land vehicle is formed in block 1302 using the front cage mold unit 810, the rear floor mold unit 820, and a first one of the intermediate mold units 832, 834, 836 (i.e., according to the method 1100) and (ii) the second monocoque of the second land vehicle is formed in block 1306 using the front cage mold unit 810, the rear floor mold unit 820, and a second one of the intermediate mold units 832, 834, 836 that is different from the first one, the third monocoque of the third land vehicle is formed using the front cage mold unit 810, the rear floor mold unit 820, and a third one of the intermediate mold units 832, 834, 836 that is different from the first one and the second one.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:
a monocoque supporting a plurality of wheels,
wherein:
the monocoque includes a front cage defining an operator cabin, a rear floor positioned rearward of the front cage, and an intermediate section disposed between the front cage and the rear floor having a single fixed length,
the vehicle includes a stowage compartment at least partially defined by the intermediate section and the rear floor that has a plurality of sidewalls and a ceiling, and
the intermediate section, the plurality of sidewalls, and the ceiling at least partially cooperate to define an interior space of the stowage compartment that is closed off from one or more locations outside the vehicle.

2. The electric vehicle of claim 1, wherein the monocoque has a composite construction such that each of the front cage and the rear floor are formed from one or more composite materials.

3. The electric vehicle of claim 2, wherein each of the intermediate section, the plurality of sidewalls, and the ceiling is formed from one or more composite materials.

4. The electric vehicle of claim 1, wherein:
the monocoque does not include metallic material,
the monocoque includes a core and a shell that at least partially surrounds the core,
the core includes balsa wood and one or more of the following: fiberglass, polyparaphenylene terephthalamide, carbon fiber, or plastic, and
the shell is formed from resin and fiberglass.

5. The electric vehicle of claim 4, wherein the monocoque includes a laminate layer that at least partially covers the shell.

6. The electric vehicle of claim 1, wherein each of the intermediate section, the plurality of sidewalls, and the ceiling does not include metallic material.

7. The electric vehicle of claim 6, wherein the stowage compartment has a volume of 650 cubic feet, 1000 cubic feet, or 1200 cubic feet.

8. The electric vehicle of claim 6, wherein the vehicle has a weight limit of between 10,001 pounds and 14,000 pounds.

9. The electric vehicle of claim 6, further comprising a refrigeration unit at least partially housed by the stowage compartment that is configured to cool the stowage compartment.

10. The electric vehicle of claim 1, wherein the vehicle does not include an internal combustion engine, and wherein movement of the vehicle is driven by one or more electric motors.

11. The electric vehicle of claim 10, wherein a height of the rear floor above an underlying surface is between 22 inches and 28 inches.

12. The electric vehicle of claim 10, wherein each of the plurality of sidewalls is formed without an opening extending therethrough.

13. An electric vehicle comprising:
a monocoque supporting a plurality of wheels,
wherein:
the monocoque includes a front cage defining an operator cabin, a rear floor positioned rearward of the front cage, and an intermediate section disposed between the front cage and the rear floor having a single fixed length,
the vehicle includes a stowage compartment at least partially defined by the intermediate section and the rear floor that has a plurality of sidewalls and a ceiling,
each of the plurality of sidewalls is formed without an opening extending therethrough, and
movement of the vehicle is driven by one or more electric motors.

14. The electric vehicle of claim 13, wherein the intermediate section, the plurality of sidewalls, and the ceiling at least partially cooperate to define an interior space of the stowage compartment that is closed off from one or more locations outside the vehicle.

15. The electric vehicle of claim 14, wherein the monocoque includes a core formed from polyparaphenylene terephthalamide and a shell formed from resin and fiberglass that at least partially surrounds the core.

16. The electric vehicle of claim 15, wherein the core includes carbon fiber.

17. The electric vehicle of claim 16, the monocoque includes a laminate layer that at least partially covers the shell.

18. The electric vehicle of claim 13, further comprising a refrigeration unit at least partially housed by the stowage compartment that is configured to cool the stowage compartment.

19. The electric vehicle of claim 18, wherein the refrigeration unit is mounted in the stowage compartment along a corner at which one of the plurality of sidewalls and the ceiling intersect.

20. An electric vehicle comprising:
a monocoque supporting a plurality of wheels,
wherein:
the monocoque includes a front cage defining an operator cabin, a rear floor positioned rearward of the front cage, and an intermediate section disposed between the front cage and the rear floor having a single fixed length,
the vehicle includes a stowage compartment at least partially defined by the intermediate section and the rear floor that has a plurality of sidewalls and a ceiling,
the intermediate section, the plurality of sidewalls, and the ceiling at least partially cooperate to define an interior space of the stowage compartment that is closed off from one or more locations outside the vehicle, and
each of the plurality of sidewalls is formed without an opening extending therethrough.

* * * * *